United States Patent
Yoneda et al.

(10) Patent No.: US 8,756,994 B2
(45) Date of Patent: Jun. 24, 2014

(54) VIBRATING GYRO DEVICE AND MANUFACTURING METHOD THEREFOR

(75) Inventors: Toshimaro Yoneda, Nagaokakyo (JP); Tsuguji Kambayashi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 435 days.

(21) Appl. No.: 13/150,349

(22) Filed: Jun. 1, 2011

(65) Prior Publication Data

US 2011/0226058 A1   Sep. 22, 2011

Related U.S. Application Data

(63) Continuation of application No. PCT/JP2009/070534, filed on Dec. 8, 2009.

(30) Foreign Application Priority Data

Dec. 9, 2008   (JP) .................................. 2008-313623

(51) Int. Cl.
   *G01C 19/56* (2012.01)
(52) U.S. Cl.
   USPC ...................................... 73/504.12; 73/504.13
(58) Field of Classification Search
   USPC ................. 73/504.12, 504.13, 504.15, 504.04
   See application file for complete search history.

(56) References Cited

U.S. PATENT DOCUMENTS

| | | | | |
|---|---|---|---|---|
| 5,226,321 A | * | 7/1993 | Varnham et al. ........... | 73/514.02 |
| 6,009,751 A | * | 1/2000 | Ljung ........................ | 73/504.02 |
| 6,151,964 A | * | 11/2000 | Nakajima .................. | 73/504.13 |
| 6,282,958 B1 | * | 9/2001 | Fell et al. ................... | 73/504.13 |
| 6,539,804 B1 | * | 4/2003 | Iwata ......................... | 73/504.13 |
| 7,637,156 B2 | * | 12/2009 | Araki et al. ................ | 73/504.13 |

(Continued)

FOREIGN PATENT DOCUMENTS

| CN | 1576785 A | 2/2005 |
|---|---|---|
| CN | 1705138 A | 12/2005 |

(Continued)

OTHER PUBLICATIONS

Official Communication issued in International Patent Application No. PCT/JP2009/070534, mailed on Feb. 23, 2010.

(Continued)

*Primary Examiner* — Helen Kwok
(74) *Attorney, Agent, or Firm* — Keating & Bennett, LLP (57) ABSTRACT

A vibrating gyro device includes a piezoelectric substrate, an upper main surface electrode, a lower main surface electrode, and a support substrate. The piezoelectric substrate is provided with inner open holes and outer open holes. Side edge surfaces of a frame-shaped region in the X-Y plane are exposed to the interior of the frame through the inner open holes. Side edge surfaces of the frame-shaped region are exposed to the exterior of the frame through the outer open holes. Drive detection electrodes arranged within the upper main surface electrode are bonded to the upper main surface of the frame-shaped region and together with the lower main surface electrode are electromechanically coupled with deformation of the frame-shaped region in the Z-axis direction and deformation of the frame-shaped region in a direction parallel or substantially parallel to the X-Y plane. The support substrate provides a vibration space for the frame-shaped region and supports the piezoelectric substrate. The vibration space prevents interference between the frame-shaped region and the support substrate and connects the inner open holes and the outer open holes.

18 Claims, 6 Drawing Sheets

(56) References Cited

U.S. PATENT DOCUMENTS

| | | | |
|---|---|---|---|
| 7,958,781 B2 * | 6/2011 | Fell | 73/504.13 |
| 8,375,792 B2 * | 2/2013 | Ikeda et al. | 73/504.13 |
| 2003/0000306 A1 * | 1/2003 | Fell | 73/504.12 |
| 2004/0118205 A1 * | 6/2004 | Fell et al. | 73/504.13 |
| 2005/0266599 A1 | 12/2005 | Ikegami | |
| 2005/0284223 A1 | 12/2005 | Karaki et al. | |
| 2008/0083278 A1 | 4/2008 | Takahashi et al. | |
| 2010/0281976 A1 * | 11/2010 | Ikeda et al. | 73/504.12 |
| 2011/0041606 A1 * | 2/2011 | Ikeda et al. | 73/504.12 |
| 2011/0308315 A1 * | 12/2011 | Araki et al. | 73/504.12 |

FOREIGN PATENT DOCUMENTS

| | | |
|---|---|---|
| CN | 1828224 A | 9/2006 |
| EP | 1 677 074 A1 | 7/2006 |
| JP | 06-042971 A | 2/1994 |
| JP | 08-068638 A | 3/1996 |
| JP | 08-278147 A | 10/1996 |
| JP | 3218702 B2 | 10/2001 |
| JP | 2002-510398 A | 4/2002 |
| JP | 2005-195574 A | 7/2005 |
| JP | 2005-529306 A | 9/2005 |
| WO | 99/47891 A1 | 9/1999 |
| WO | 03/025503 A1 | 3/2003 |

OTHER PUBLICATIONS

Official Communication issued in corresponding Japanese Patent Application No. 2010-542104, mailed on Mar. 12, 2013.

* cited by examiner

VIBRATING GYRO DEVICE AND MANUFACTURING METHOD THEREFOR

BACKGROUND OF THE INVENTION

1. Field of the Invention

The present invention relates to vibrating gyro devices that detect rotation by utilizing deformation of a piezoelectric substance in a direction perpendicular or substantially perpendicular to a main surface of the piezoelectric substance and deformation of the piezoelectric substance in a direction parallel or substantially parallel to a main surface of the piezoelectric substance, and also relates to methods for manufacturing such vibrating gyro devices.

2. Description of the Related Art

A vibrating gyro device that detects rotation includes, for example, a vibrating board to which a piezoelectric ceramic has been affixed or a vibrating board made of a piezoelectric single crystal, such as quartz, lithium niobate, or lithium tantalate, and detects the Coriolis force acting on the vibrator. Such vibrators have a variety of shapes including a tuning fork shape, a square-cross-section tuning bar shape, an equilateral-triangle-cross-section tuning bar shape, a circular tuning bar shape, and an H shape (see, for example, "Piezoelectric Vibrating Gyroscope", Journal of the Acoustical Society of Japan Vol. 45 No. 5 pp. 402-408, 1989, "Piezoelectric Vibrating Gyroscope Angular Velocity Sensor," IEICE Transactions Vol. J78-C-I pp. 547-556, February 1995, and "Electronic Mechanism Device Employing Lithium Niobate and Lithium Tantalate Piezoelectric Single Crystals" IEICE Transactions Vol. J87-C No. 2 pp. 216-224, February 2004 and JP Patent No. 3218702).

Figure 1A:
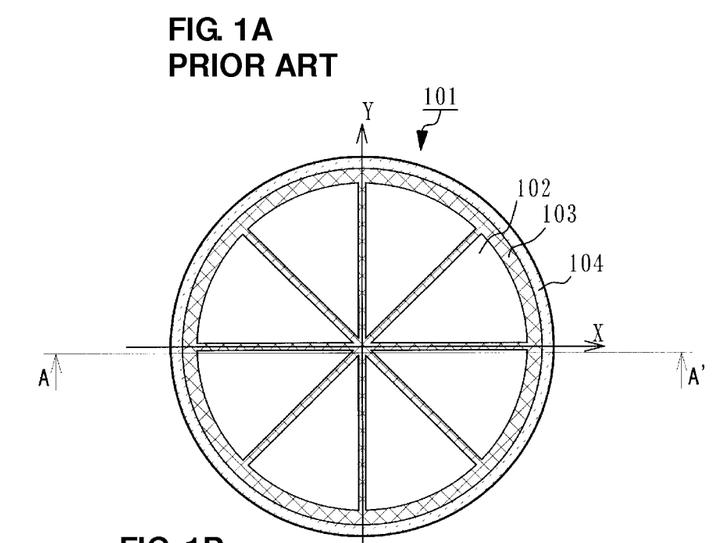
FIGS. 1A and 1B show the configuration of a conventional vibrating gyro device.
Figure 1B:
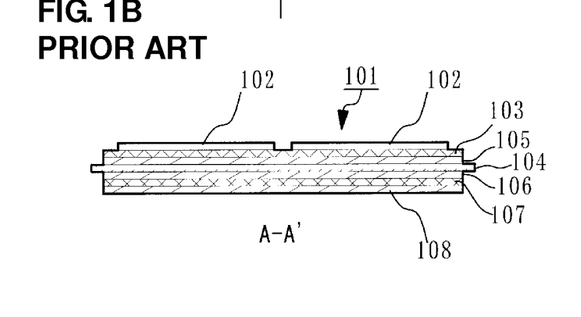

FIGS. 1A and 1B show the configuration of an example of a conventional vibrating gyro device.

This vibrating gyro device 101 includes a vibrating board 104, eight detection vibrators, and one driving vibrator. Each of the detection vibrators includes a detection electrode 102, a piezoelectric board 103, and a detection electrode 105. The driving vibrator includes a driving electrode 106, a piezoelectric board 107, and a driving electrode 108. The driving vibrator excites bending vibration in the vibrating board 104 in a direction perpendicular to a main surface of the vibrating board 104. In each pair of the eight detection vibrators arranged on either side of a corresponding one of two perpendicular detection axes (X axis and Y axis) of the vibrating gyro device 101, an output signal is excited by a difference between outputs thereof corresponding to the Coriolis force of rotation about the detection axis that is interposed between the pair of detection vibrators.

This type of vibrating gyro device, which is capable of detecting rotation about each of a plurality of axes of rotation, is used in automobile navigation systems, camera shake-compensation circuits, remote controllers of game consoles, mobile telephones and other suitable devices. In these applications, it is desirable to reduce the size of vibrating gyro devices to be less than that of conventional vibrating gyro devices.

In the tuning-fork-shaped and tuning-bar-shaped vibrating gyro devices described in "Piezoelectric Vibrating Gyroscope", Journal of the Acoustical Society of Japan Vol. 45 No. 5 pp. 402-408, 1989, "Piezoelectric Vibrating Gyroscope Angular Velocity Sensor," IEICE Transactions Vol. J78-C-1 pp. 547-556, February 1995, "Electronic Mechanism Device Employing Lithium Niobate and Lithium Tantalate Piezoelectric Single Crystals" IEICE Transactions Vol. J87-C No. 2 pp. 216-224, February 2004 and JP Patent No. 3218702), for each vibrator, only a single detection axis can be provided and a plurality of vibrators are required to provide a plurality of detection axes, which is not suitable to reduce the size of the device. In particular, in a configuration in which electrodes are not only formed on the front and back but also on the side surfaces of a vibrator, since the forming of electrodes and wiring therefor on the side surfaces is difficult when the size of the vibrator is reduced, there are limits on how thin the vibrator can be made.

A disk-shaped vibrating gyro device described in JP Patent No. 3218702 can detect rotation about two orthogonal axes, but the thinner the vibrating board is made, the lower the rigidity of the board becomes and, therefore, as the amount that the vibrating board bends under its own weight increases, the deviation from the ideal vibration mode increases. Furthermore, there is a risk of the vibrating board bending and thereby coming into contact with a supporting body and, therefore, it is necessary to provide a larger vibration space. Therefore, there are limits to how thin the vibrating board can be made.

SUMMARY OF THE INVENTION

To overcome the problems described above, preferred embodiments of the present invention provide a vibrating gyro device that is smaller and thinner than conventional vibrating gyro devices while still providing the appropriate vibration mode.

A vibrating gyro device according to a preferred embodiment of the present invention preferably includes a piezoelectric substance, a pair of main surface electrodes and a supporting body. The piezoelectric substance preferably includes an inner opening portion and an outer opening portion. An inner side surface of a frame-shaped region in a main surface of the piezoelectric substance is exposed through the inner opening portion. An outer side surface of the frame-shaped region is exposed through the outer opening portion. Preferably, the pair of main surface electrodes are bonded to the front and back main surfaces of the frame-shaped region and are electromechanically coupled with displacement of the frame-shaped region in a direction perpendicular or substantially perpendicular to the main surface of the piezoelectric substance and with displacement of the frame-shaped region in a direction parallel or substantially parallel to the main surface of the piezoelectric substance. The supporting body provides a vibration space for the frame-shaped region and supports the piezoelectric substance. The vibration space prevents other members from interfering with the frame-shaped region and the inner opening portion and the outer opening portion are connected therethrough.

With this configuration, a vibrator preferably includes the pair of main surface electrodes provided in the frame-shaped region of the piezoelectric substance. Therefore, even though the vibrating gyro device has a relatively small size by omitting a vibrating board, the frame-shaped region is arranged to vibrate and deformation due to the Coriolis force is generated. Furthermore, as a result of providing the inner opening portion and the outer opening portion in the piezoelectric substance, the weight of the piezoelectric substance is reduced, restraining of the frame-shaped region around the boundary thereof is reduced and, thereby, stress acting on the frame-shaped region is prevented. Consequently, strain is reduced and the vibration mode of the frame-shaped region is appropriately maintained, and, as a result, detection accuracy of the vibrating gyro device is ensured, even though the thickness of the vibrator is reduced. Furthermore, since bending of the piezoelectric substance due to its own weight is significantly reduced, the risk of the piezoelectric substance coming into contact with the supporting body is reduced and the size of the vibration space can be reduced.

In addition, a vibrating gyro device according to another preferred embodiment of the present invention that detects rotation about each of two orthogonal axes of rotation in a plane parallel or substantially parallel to a main surface of a piezoelectric substance includes the piezoelectric substance, a plurality of pairs of main surface electrodes and a supporting body. The piezoelectric substance preferably includes an inner opening portion and an outer opening portion having axisymmetrical shapes, the two axes of rotation defining axes of symmetry.

The plurality of pairs of main surface electrodes are preferably axisymmetrically arranged with the two axes of rotation defining axes of symmetry and being bonded to front and back main surfaces of a frame-shaped region.

With this configuration, the frame-shaped region, in which strain is relatively small, is also arranged to vibrate in a suitable vibration mode and deformation due to the Coriolis force is generated, and the vibrating gyro device is relatively small while still ensuring detection accuracy. Two pairs of main surface electrodes, which are arranged on either side of each of the two perpendicular axes of rotation, output voltages having the same amplitude but opposite phases in accordance with rotation about the axis of rotation therebetween. On the other hand, when rotation occurs about another axis of rotation or the device is subjected to an impact, voltages of the same amplitude and same phase are output from the two pairs of main surface electrodes. Thus, by using the difference in output between two pairs of main surface electrodes, a difference in output corresponding to rotation about the axis of rotation interposed between the two pairs of main surface electrodes can be detected and the signal processing can be simplified.

The piezoelectric substance preferably includes an inner region that is inside the frame-shaped region. Preferably, the inner region is supported by the supporting body and the inner region supports the frame-shaped region. In this case, the entire portion of the piezoelectric substance that is outside the frame-shaped region may preferably define an outer opening portion. Furthermore, it is preferable that the piezoelectric substance be provided with an outer region that is outside the frame-shaped region. Preferably, the outer region is supported by the supporting body and the outer region supports the frame-shaped region. In this case, the entire portion of the piezoelectric substance that is inside the frame-shaped region may preferably define the inner opening portion or a piezoelectric substance that defines an inner region inside the frame-shaped region may preferably be provided.

With the above-described configuration, bending of the piezoelectric substance due to its own weight is prevented by providing opening portions inside and outside the frame-shaped region and supporting the frame-shaped region, whereby the vibration mode of the frame-shaped region is appropriately maintained and detection accuracy of the vibrating gyro device is ensured even through the thickness of the vibrator is reduced.

Preferably, beams that connect the inner region or the outer region and the frame-shaped region are integrally provided with the piezoelectric substrate. Thus, the frame-shaped region can be formed and supported by only patterning the piezoelectric substrate.

The beams may preferably be provided at positions shifted by about 45° from the axes of rotation. In this manner, the beams are prevented from restraining the displacement of the piezoelectric substrate about the axes of rotation, the vibration mode of the frame-shaped region is appropriately maintained, and the detection accuracy of the vibrating gyro device is ensured even though the thickness of the vibrator is reduced.

An insulating layer is preferably provided between the beams and wirings. Thus, detecting of a voltage due to displacement of a beam is eliminated and the detection accuracy of the vibrating gyro device is ensured even though the thickness of the vibrator is reduced.

The frame-shaped region may preferably have a circular or substantially circular frame shape or a rectangular or substantially rectangular frame shape, for example, and the piezoelectric substance may preferably be a single crystal composed of lithium niobate, lithium tantalate, or quartz, for example. The symmetry of the shape of the frame-shaped region can be increased by using a circular or substantially circular frame shape and thereby it is easier to control the magnitudes of the amplitudes of vibration about the two detection axes so as to be equal or substantially equal to each other. Mounting efficiency can be increased by using a rectangular or substantially rectangular frame shape, whereby it is possible to densely arrange ICs for driving and detection. By using lithium niobate, the electromechanical coupling coefficient and the Q value can be increased and excellent sensitivity characteristics can be obtained. By using lithium tantalate, the balance between sensitivity and temperature characteristics can be improved. By using quartz, the temperature characteristics become very good and the temperature stability characteristics are excellent.

According to another preferred embodiment of the present invention, a method for manufacturing the above-described vibrating gyro device preferably includes a step of providing a sacrificial layer, which will become the vibration space, on the supporting body, a step of bonding the piezoelectric substance to the top of the supporting body and the sacrificial layer, and a step of removing the sacrificial layer by allowing an etchant to contact the sacrificial layer through the inner opening portion or outer opening portion of the piezoelectric substance.

With this manufacturing method, since the etchant contacts the sacrificial layer through the inner opening portion and the outer opening portion, there is no need to provide a separate etchant introduction hole or other suitable structure, thereby simplifying the manufacturing process.

The manufacturing method of another preferred embodiment of the present invention preferably includes a step of implanting an ion into a piezoelectric substrate and a step of forming and separating the piezoelectric substance by heating the ion-implanted piezoelectric substrate. Furthermore, it is preferable to include a step of forming a mask on the piezoelectric substance, the mask being provided with openings at positions at which the inner opening portion and the outer opening portion are to be formed, and a step of subjecting the piezoelectric substance provided with the mask to etching so as to be provide the inner opening portion and the outer opening portion and then removing the mask.

With this manufacturing method, the piezoelectric substance can be made extremely thin and, therefore, the amount of piezoelectric material used to manufacture the piezoelectric substrate can be significantly reduced. Furthermore, the amount of processing required in the etching step to pattern the piezoelectric substance can be reduced and, therefore, damage to the piezoelectric substance is prevented and the time required for the etching step is reduced. In addition, patterning of the piezoelectric substrate can be performed even for complex shapes, and the main surface electrodes and wirings can be formed at the same time, thereby simplifying the manufacturing process.

According to various preferred embodiments of the present invention, a vibrator preferably includes a pair of main surface electrodes arranged in a frame-shaped region of a piezoelectric substance. Therefore, even though the vibrating gyro device has a small size due to the omission of a vibrating board, the frame-shaped region vibrates and deformation due to the Coriolis force can be generated. Furthermore, as a result of providing the inner opening portion and the outer opening portion in the piezoelectric substance, the weight of the piezoelectric substance is reduced such that the restraint of the frame-shaped region around the boundary thereof is reduced and thereby stress acting on the frame-shaped region is reduced. Consequently, strain is reduced and the vibration mode of the frame-shaped region is appropriately maintained. As a result, the detection accuracy of the vibrating gyro device is ensured even though the thickness of the vibrator is reduced. Furthermore, since bending of the piezoelectric substance due to its own weight is prevented, the risk of the piezoelectric substance coming into contact with the supporting body is reduced and the size of the vibration space can be reduced.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 2A:
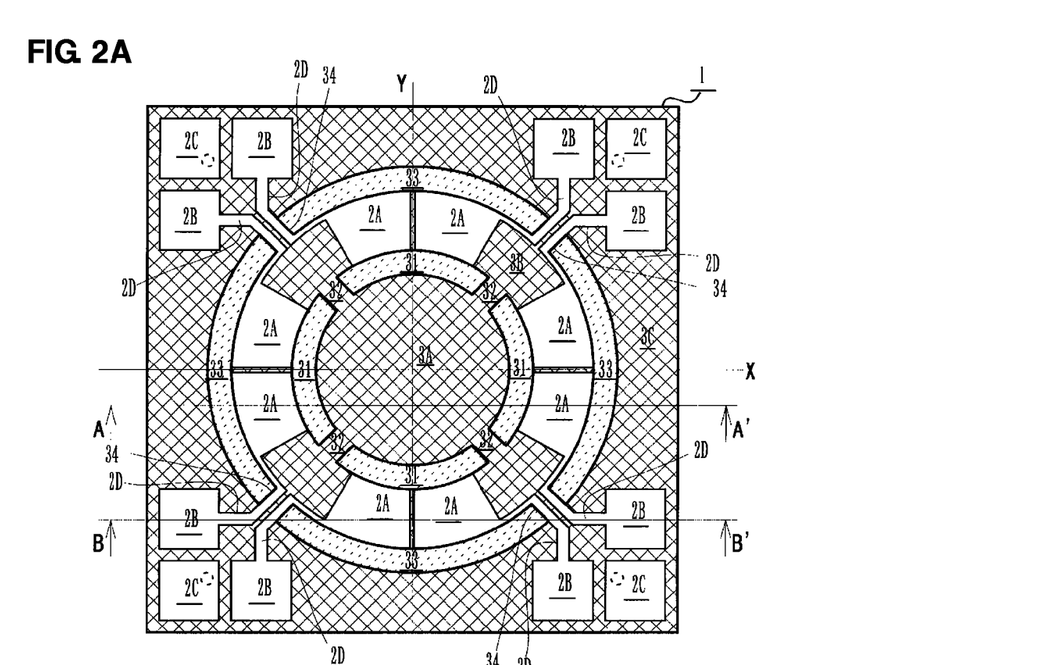
FIGS. 2A to 2D show the configuration of a vibrating gyro device according to a first preferred embodiment of the present invention.
Figure 2B:
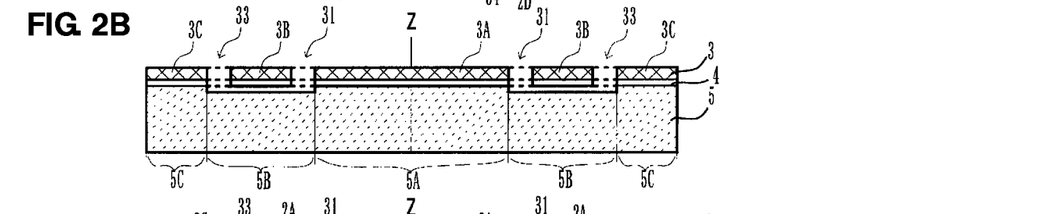
Figure 2C:
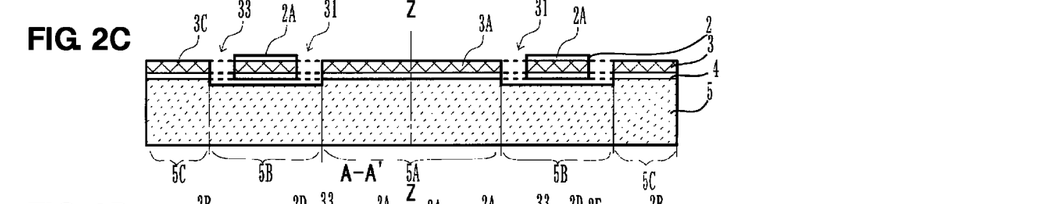
Figure 2D:
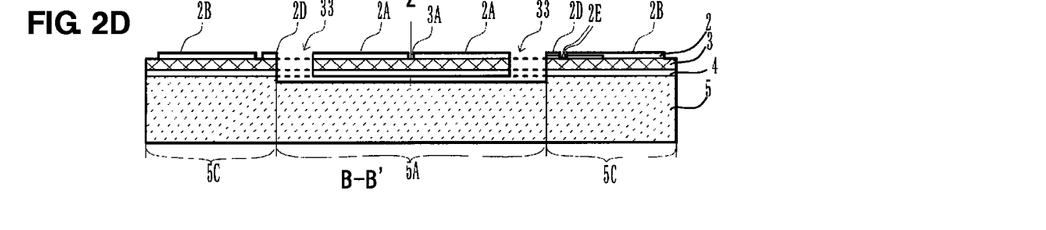

A vibrating gyro device according to a first preferred embodiment of the present invention will be described. FIGS. 2A to 2D show an example configuration of a vibrating gyro device. FIG. 2A is a top view, FIG. 2B is a central sectional view, FIG. 2C is a sectional view along line A-A' and FIG. 2D is a sectional view along line B-B'.

A vibrating gyro device 1 preferably has a shape that is axisymmetrical about an X axis, which defines an axis of symmetry, and that is axisymmetrical about a Y axis, which also defines an axis of symmetry, so as to be capable of detecting rotation about two perpendicular axes (X axis and Y axis). Furthermore, a support substrate 5, a lower main surface electrode 4, a piezoelectric substance 3, and an upper main surface electrode 2 are preferably stacked on top of one another in this order from the bottom upward along a Z axis, which is perpendicular to the X-Y plane.

The support substrate 5 and the piezoelectric substrate 3 are preferably lithium niobate ($LiNbO_3$) substrates having right-handed Euler angles of (0°, 50°, 0°), for example, and the support substrate 5 preferably has a thickness of about 0.34 mm, for example, and the piezoelectric substrate 3 preferably has a thickness of about 1 μm, for example. By using lithium niobate, the electromechanical coupling coefficient and the Q value of a vibrator is increased and excellent sensitivity characteristics are obtained. On the other hand, rather than lithium niobate, if lithium tantalate is used, the balance between sensitivity and temperature characteristics can be improved and if quartz is used, the temperature stability characteristics can be improved. Preferably, the lower main surface electrode 4 is a tungsten (W) electrode having a thickness of about 500 nm and the upper main surface electrode 2 is an aluminum (Al) electrode, for example.

The piezoelectric substrate 3 is divided into an inner region 3A, a frame-shaped region 3B, and an outer region 3C when viewed from a main surface (X-Y plane) of the piezoelectric substance. Preferably, the frame-shaped region 3B is frame shaped, has a circular or substantially circular inner shape and a circular or substantially circular outer shape, and has an inner diameter of about 400 μm and an outer diameter of about 500 μm, for example. Preferably, the inner region 3A is a circular or substantially circular region having a diameter of about 300 μm, for example, and is bonded to the support substrate 5 with the lower main surface electrode 4 therebetween. Preferably, the outer region 3C has a circular or substantially circular inner shape with an inner diameter of about 600 μm, for example, and a rectangular or substantially rectangular outer shape and is bonded to the support substrate 5 with the lower main surface electrode 4 therebetween. Four inner open holes 31 and four inner beams 32 are preferably provided between the inner region 3A and the frame-shaped region 3B and four outer open holes 33 and four inner beams 32 are preferably provided between the outer region 3C and the frame-shaped region 3B. Preferably, the inner beams 32 and the outer beams 34 are defined by regions having a thickness of about 20 μm and that extend in directions of about 45°, about 135°, about 225, and about 315, for example, in the X-Y plane with the positive X axis direction being 0°. These inner beams 32 and outer beams 34 support the frame-shaped region 3B so that the frame-shaped region 3B is suspended above the support substrate 5. The inner open holes 31 correspond to the inner opening portions according to a preferred embodiment of the present invention and the outer open holes 33 correspond to the outer opening portions according to a preferred embodiment of the present invention and the inner side surface and the outer side surface of the frame-shaped region 3B are respectively exposed therethrough. Here, by using a circular or substantially circular shape, the symmetry of the shape of the frame-shaped region 3B is increased and it is easy to make the magnitudes of the amplitudes of vibration about the two detection axes be the same or substantially the same.

The support substrate 5 corresponds to the supporting body according to a preferred embodiment of the present invention and preferably includes an inner region 5A, a vibration region 5B, and an outer region 5C in the X-Y plane. The vibration region 5B is a region in which a vibration space extends into the support substrate 5 preferably to a depth of about 3 μm, for example, from the upper main surface thereof to have a frame shape having a circular or substantially circular inner shape and a circular or substantially circular outer shape preferably with an inner diameter of about 300 μm and an outer diameter of about 600 μm, for example. The vibration region 5B is preferably provided at positions facing the frame-shaped region 3B, the inner open holes 31, the inner beams 32, the outer open holes 33, and the outer beams 34 of the piezoelectric substrate 3. The vibration space connects the inner open holes 31 and the outer open holes 33 and prevents interference between the frame-shaped region 3B and the support substrate 5. The inner region 5A preferably has a diameter of about 300 μm, for example, and the inner region 3A of the piezoelectric substrate is bonded to the upper main surface of the inner region 5A. The outer region 5C preferably has an inner diameter of about 600 μm, for example, and the outer region 3C of the piezoelectric substrate 3 is bonded to the upper main surface of the outer region 5C. The same piezoelectric material as for the piezoelectric substrate 3 is preferably used for the support substrate 5. However, Si or glass, for example, may be used, which have different thermal expansion coefficients from the piezoelectric substrate 3, but which are excellent in terms of thermal resistance, are easily obtained, and are inexpensive.

The upper main surface electrode 2 preferably includes eight drive detection electrodes 2A, eight circuit-connection electrodes 2B, four reference-potential-connection electrodes 2C, and eight wirings 2D. The drive detection electrodes 2A are patterned on the upper surface of the frame-shaped region 3B. The circuit-connection electrodes 2B and the reference-potential-connection electrodes 2C are patterned on the upper surface of the outer region 3C. The wirings 2D are arranged so as to span from the frame-shaped region 3B to the outer region 3C via the outer beams. Two of the drive detection electrodes 2A are preferably arranged on either side of the X axis on the positive direction side, on either side of the X axis on the negative direction side, on either side of the Y axis on the positive direction side, and on either side of the Y axis on the negative direction side. Specifically, the individual drive detection electrodes 2A preferably occupy ranges of approximately 0° to 30°, 60° to 90°, 90° to 120°, 150° to 180°, 180° to 210°, 240° to 270°, 270° to 300°, and 330° to 360°, for example, in the X-Y plane, where the positive Y-axis direction is 0°. Adjacent drive detection electrodes 2A are preferably separated by gaps of approximately 5 μm, for example. The circuit-connection electrodes 2B are connected to a drive detection circuit, which will be described in detail below. The reference-potential-connection electrodes 2C are connected to the lower main surface electrode 4 via through holes. The wirings 2D connect the drive detection electrodes 2A and the circuit-connection electrodes 2B to one another, and are bonded to the piezoelectric substrate 3 with insulating layers 2E therebetween. Since the insulating layers 2E are provided, excitation of voltage in the wirings 2D due to displacement of a beam is eliminated. The lower main surface electrode 4 is provided over the entire or substantially the entire lower main surface of the piezoelectric substrate 3 and is connected to a reference potential through the reference-potential-connection electrodes 2C. The individual drive detection electrodes 2A face the lower main surface electrode 4 and are included in pairs of main surface electrodes, and are electromechanically coupled with displacement of the frame-shaped region 3B in the Y-axis direction and with displacement of the frame-shaped region 3B in the X-axis direction and the Y-axis direction.

The vibrating gyro device 1 includes a plurality of vibrators in which the drive detection electrodes 2A and the lower main surface electrode 4 are provided in the frame-shaped region 3B of the piezoelectric substrate 3. Consequently, a simple structure is provided that does not include a vibrating board, and as compared to the conventional structure of FIG. 1 that includes a vibrating board, the number of vibrators, the number of wirings, and the number of multilayer substrates are reduced and a complex vibrating gyro device that performs detection about two perpendicular axes using a single device has a reduced size.

Furthermore, since the piezoelectric substrate 3 includes the inner open holes 31 and the outer open holes 33 configured so as have shapes that are axisymmetrical about two perpendicular axes, the weight of the piezoelectric substrate 3 is reduced and bending of the piezoelectric substrate 3 is prevented. Furthermore, restraint of the boundary of the frame-shaped region is reduced, whereby stress acting on the frame-shaped region is reduced. Therefore, even though the rigidity of the piezoelectric substrate 3 is reduced due to the thickness of the piezoelectric substrate 3 being reduced, the desired vibration mode is readily obtained. Furthermore, since bending of the piezoelectric substrate 3 is prevented, it is not likely that the piezoelectric substrate 3 and the support substrate 5 will come into contact with each other and, therefore, a thinner vibration space may be provided.

Figure 3:
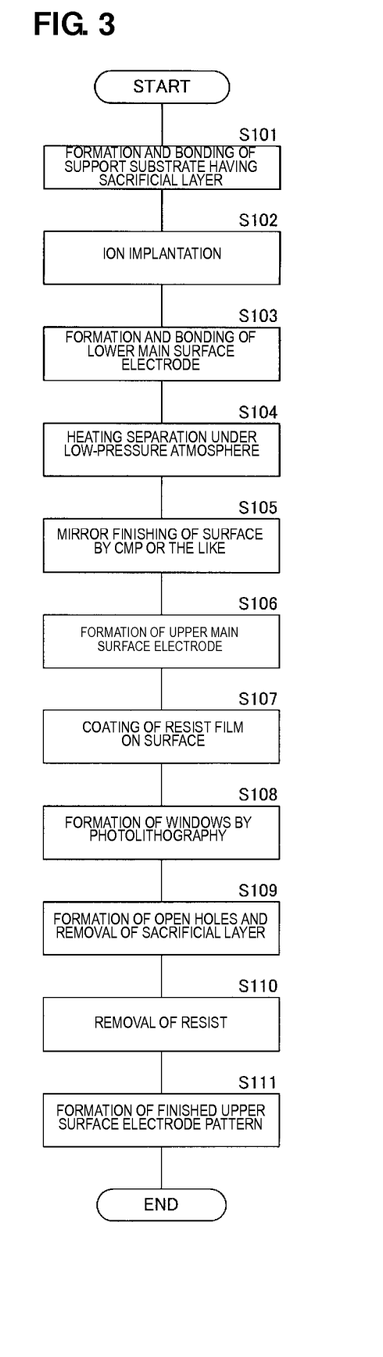
FIG. 3 is a flow chart of the manufacturing of the vibrating gyro device illustrated in FIGS. 2A to 2D.

Next, a method of manufacturing the vibrating gyro device 1 according to a preferred embodiment of the present invention will be described. FIG. 3 is a flow chart of a method of manufacturing the vibrating gyro device 1. In this method, a thin film of the piezoelectric substrate is preferably formed by ion implantation, for example.

First, a recess is provided in the support substrate 5 by, for example, reactive ion etching, a copper film defining a sacrificial layer is deposited in the recess and the surface is planarized by CMP, or other suitable method (S101), for example.

Next, a piezoelectric single crystal body having a predetermined thickness is prepared and hydrogen ions are implanted from a main surface thereof (S102). The piezoelectric single crystal body is preferably a lithium niobate substrate, for example, and a hydrogen ion implantation layer is preferably formed at a position at a depth of approximately 1 μm, for example, from the ion implantation surface by performing hydrogen ion implantation with an acceleration energy of about 150 KeV and at a dose of about $1.0 \times 10^{17}$ atoms/cm$^2$, for example.

Next, an electrode film, which will become the lower main surface electrode 4, is formed on the surface of the support substrate 5 on which the sacrificial layer was formed, the surface is planarized by being polished by CMP processing or other suitable method, for example, and the surface is bonded to the ion implantation surface of the piezoelectric single crystal body (S103).

Next, the piezoelectric single crystal body, which is bonded to the support substrate 5, is placed in a reduced-pressure atmosphere and heated at about 500° C., for example, and a portion is detached therefrom by utilizing the hydrogen ion implantation layer (S104). Thus, a piezoelectric single crystal thin film, which is supported by the support substrate 5, is preferably provided as the piezoelectric substrate 3. In this manner, the piezoelectric substrate 3 can be made extremely thin, and therefore, the amount of piezoelectric single crystal used can be significantly reduced.

Next, the upper main surface of the piezoelectric substrate 3, which is the detachment surface, is mirror finished by performing CMP or other suitable method (S105), for example.

Next, the upper main surface electrode 2 is formed on the upper main surface of the piezoelectric substrate 3 preferably by performing patterning using aluminum by using an electron-beam evaporation technique or a photolithography technique (S106), for example.

Next, a resist film is formed on the upper main surface of the piezoelectric substrate 3 (S107). Then, etching windows are formed in the resist film by using a photolithography technique (S108), for example.

Next, with the resist film defining a mask, the inner open holes 31 and the outer open holes 33 are formed by introducing an etching solution or an etching gas into the etching windows. Then, the sacrificial layer, which is preferably a copper film, for example, is removed by introducing a copper etching solution onto the sacrificial layer from the inner open holes 31 and outer open holes 33. Thus, the vibration space is formed beneath the frame-shaped region 3B (S109).

After removal of the sacrificial layer, the resist film is removed, through holes connecting the reference-potential-connection electrodes 2C and the lower main surface electrode 4 are formed and packaging is performed (S110). Next, except for the drive detection electrodes 2A on the upper main surface of the piezoelectric substrate 3, aluminum, for example, is thickly deposited on the electrodes so as to reduce the electrical resistances of wirings at these electrodes (S111).

As described above, the piezoelectric substrate 3 is patterned using microfabrication techniques, such as photolithography techniques and other suitable techniques, for example, whereby, even when the piezoelectric substrate 3 has a complex shape, highly precise processing can be performed and the detection accuracy of the vibrating gyro device can be increased. Furthermore, since the etchant contacts the sacrificial layer through the inner open holes 31 and the outer open holes 33, there is no need to provide a separate etchant introduction hole or other suitable structure, thereby simplifying the manufacturing process. In addition, since an ultrathin film is used as the piezoelectric substrate 3, the amount of required etching is reduced, and the process is shortened and damage to the piezoelectric substance is prevented.

Figure 4:
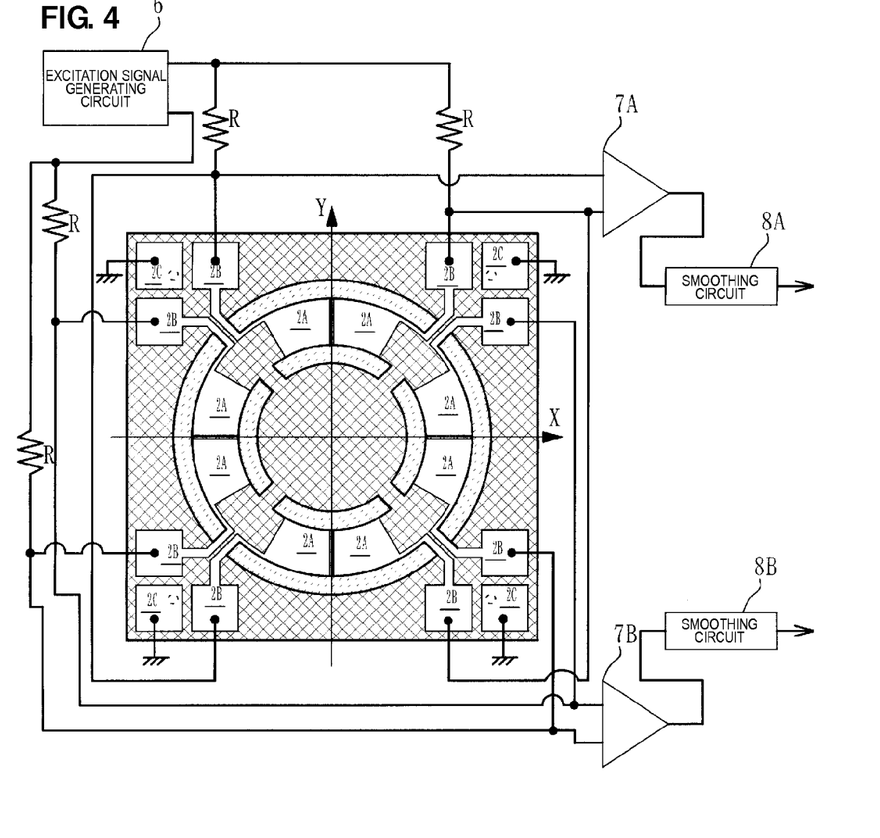
FIG. 4 shows the circuit configuration of a drive detection circuit of the vibrating gyro device illustrated in FIGS. 2A to 2D.

FIG. 4 is a circuit diagram showing a drive detection circuit connected to the vibrating gyro device 1. The drive detection circuit of the vibrating gyro device 1 preferably includes an excitation signal generating circuit 6, differential circuits 7A and 7B, and smoothing circuits 8A and 8B. The reference-potential-connection electrodes 2C are connected to the ground.

The excitation signal generating circuit 6 is connected to the eight circuit-connection electrodes 2B through drive resistors R and individually provides excitation signals to the eight drive detection electrodes 2A. The excitation signals provided to the individual drive detection electrodes 2A have the same phase and the same amplitude and the frequency thereof is that of a bending vibration mode in which displacement of the frame-shaped region 3B is excited in the Z axis direction. The frequency of the bending vibration mode is preferably set by resonance analysis using a finite element method in the design stage.

From among the four drive detection electrodes 2A arranged on either side of the Y axis, the two drive detection electrodes 2A arranged in the negative X axis direction (left of center in the figure), are connected to a first input terminal of the differential circuit 7A. Furthermore, the two drive detection electrodes 2A arranged in the positive X axis direction (right of center in the figure) are connected to a second input terminal of the differential circuit 7A. Furthermore, among the four drive detection electrodes 2A arranged on either side of the X axis, the two drive detection electrodes 2A arranged in the negative Y axis direction (lower side) are connected to a first input terminal of the differential circuit 7B and the two drive detection electrodes 2A arranged in the positive Y axis direction (upper side) are connected to a second input terminal of the differential circuit 7B.

The output terminals of the differential circuits 7A and 7B are connected to the smoothing circuits 8A and 8B and the differential circuits 7A and 7B output the difference in voltage between the respective first input terminals and the second input terminals. The smoothing circuits 8A and 8B smooth the output voltages of the differential circuits 7A and 7B.

Figure 5A:
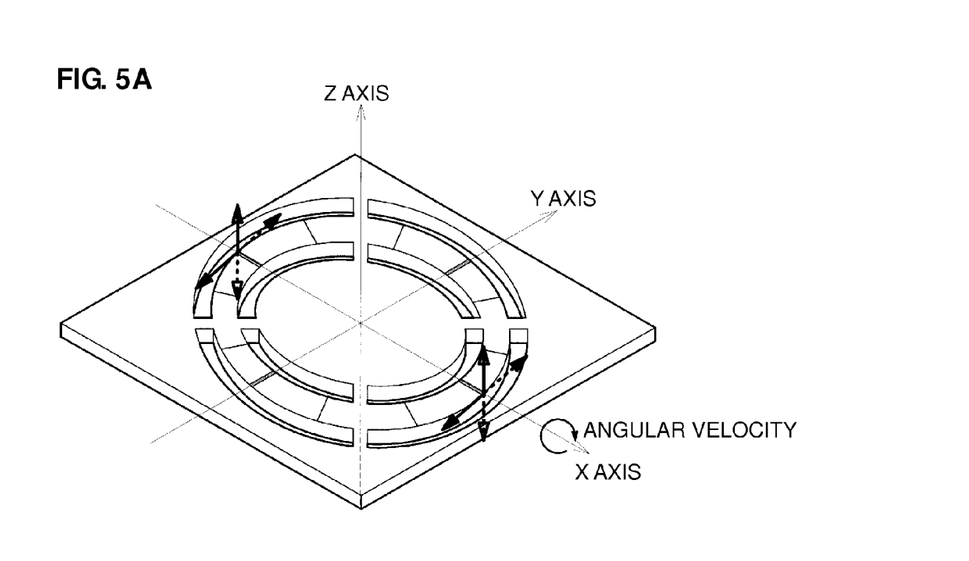
FIGS. 5A and 5B show the operation of the vibrating gyro device illustrated in FIGS. 2A to 2D.
Figure 5B:
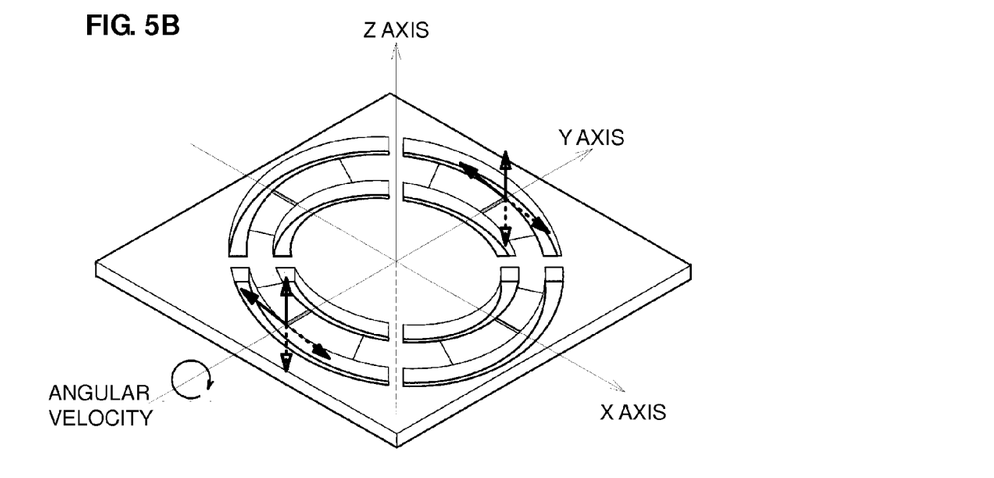

FIGS. 5A and 5B show the operation of the vibrating gyro device 1. FIG. 5A illustrates an example of rotation around the X axis and FIG. 5B illustrates an example of rotation around the Y axis.

When, as a bending vibration mode, vibration is excited in which a position (0°, 90°, 180°, 270°) on the X axis and Y axis in the X-Y plane is an anti-node of vibration and a position (45°, 135°, 225°, 315°), which is a position supported by a beam, is a node of vibration, if an angular velocity is applied about the Y axis, the Coriolis force acts about the X axis direction in the vibrating gyro device. Then, the phases of excitation signals applied to the four drive detection electrodes 2A arranged on either side of the Y axis change in opposite directions for the drive detection electrodes 2A arranged in the positive X axis direction and the drive detection electrodes 2A arranged in the negative X axis direction. Therefore, the differential output of the differential circuit 7A is a voltage corresponding to the magnitude of the Coriolis force.

Furthermore, if an angular velocity is applied to the vibrating gyro device about the X axis, the Coriolis force acts about the Y axis direction. Then, the phases of excitation signals applied to the four drive detection electrodes 2A arranged on either side of the X axis change in opposite directions for the drive detection electrodes 2A arranged in the positive Y axis direction and the drive detection electrodes 2A arranged in the negative Y axis direction. Therefore, the differential output of the differential circuit 7B is a voltage corresponding to the magnitude of the Coriolis force.

The excitation signals themselves are also input to the differential circuits 7A and 7B, and in a state in which the vibrating gyro device 1 is not rotating, the signals have the same phase and the same amplitude and are, therefore, removed by the differential circuits 7A and 7B. Furthermore, signals excited in each of the drive detection electrodes when the vibrating gyro device is subjected to a collision or other external force, signals excited in the drive detection electrodes arranged along the Y axis when rotation is occurring about the X axis, and signals excited in the drive detection electrodes arranged along the X axis when rotation is occurring about the Y axis have the same phase and the same amplitude and are also, therefore, removed by the differential circuits 7A and 7B.

Figure 6:
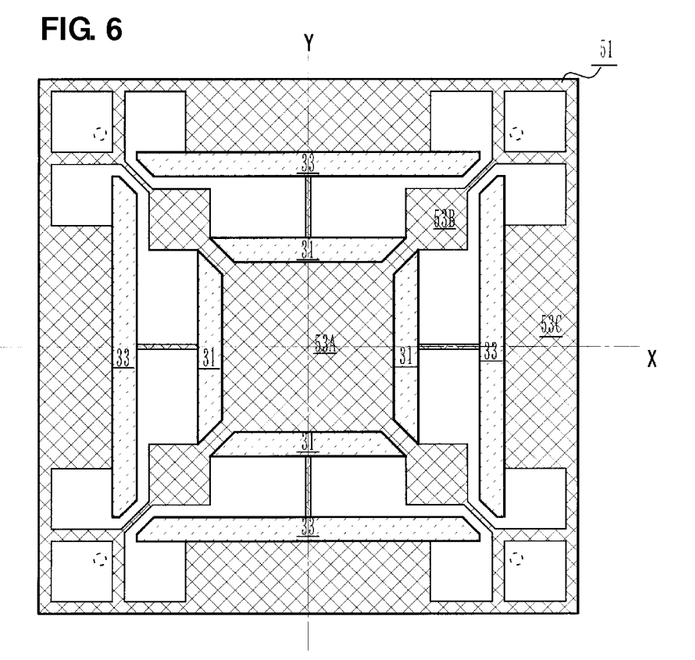
FIG. 6 shows the configuration of a vibrating gyro device according to a second preferred embodiment of the present invention.

Next, a vibrating gyro device according to a second preferred embodiment of the present invention will be described. Elements and components that are the same as those of the vibrating gyro device 1 according to the first preferred embodiment are denoted by the same symbols and description thereof is omitted.

FIG. 6 is a top view illustrating an example configuration of a vibrating gyro device according to the second preferred embodiment.

A vibrating gyro device 51 preferably has a shape that is axisymmetrical about an X axis, which defines an axis of symmetry, and that is axisymmetrical about a Y axis, which also defines an axis of symmetry, so as to be capable of detecting rotation about two perpendicular axes (X axis and Y axis), which are axes of rotation. A piezoelectric substrate is divided into an inner region 53A, a frame-shaped region 53B and an outer region 53C when viewed from a main surface (X-Y plane) of a piezoelectric substance. Preferably, the frame-shaped region 53B has a square or substantially square outer shape and a square or substantially square inner shape, the outer shape having sides of about 500 μm, for example, and the inner shape having sides of about 400 μm, for example. Preferably, the inner region 53A has a square or substantially square outer shape, the outer shape having sides of about 300 μm, for example. Preferably, the outer region 53C has a square or substantially square inner shape and a square or substantially square outer shape, the inner shape having sides of about 600 μm, for example.

If the device has a square or substantially square shape, the degree of freedom in design can be increased for the case in which an IC that defines the drive detection circuit is mounted on the device and the vibrating gyro device 51 can be configured to have a reduced in size.

In the above-described preferred embodiments of the present invention, examples were illustrated in which the frame-shaped region preferably has a circular or substantially circular shape or a square or substantially square shape, but in addition to these shapes, preferred embodiments of the present invention may also use a variety of other shapes such as oval, rectangular, or polygonal shapes. Furthermore, a configuration may be provided in which one of or both of the inner region and the outer region of the piezoelectric substrate is omitted. When both regions are omitted, a support body may be provided separately from the piezoelectric substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating gyro device comprising:
   a piezoelectric substance including a frame-shaped region, an inner opening portion through which an inner side surface of the frame-shaped region is exposed, and an outer opening portion through which an outer side surface of the frame-shaped region is exposed, the inner opening portion and the outer opening portion being provided in a main surface of the piezoelectric substance;
   a pair of main surface electrodes electromechanically coupled with displacement of the frame-shaped region in a direction perpendicular or substantially perpendicular to the main surface of the piezoelectric substance and with displacement of the frame-shaped region in a direction parallel or substantially parallel to the main surface of the piezoelectric substance and being bonded to front and back main surfaces of the frame-shaped region; and
   a supporting body arranged to prevent other members of the vibrating gyro device from interfering with the frame-shaped region, to provide a vibration space for the frame-shaped region through which the inner opening portion and the outer opening portion are connected, and to support the piezoelectric substance; wherein
   the piezoelectric substance includes an inner region that is arranged inside of the frame-shaped region;
   the inner region is supported by the supporting body and the inner region supports the frame-shaped region; and
   the frame-shaped region and the inner region are defined by portions of a same piezoelectric layer arranged on a same plane on an upper surface of the supporting body.

2. The vibrating gyro device according to claim 1, wherein an entire or substantially an entire portion of the piezoelectric substance that is arranged outside the frame-shaped region defines the outer opening portion.

3. The vibrating gyro device according to claim 1, wherein
   the piezoelectric substance includes an outer region that is arranged outside the frame-shaped region; and
   the outer region is supported by the supporting body and the outer region supports the frame-shaped region.

4. The vibrating gyro device according to claim 3, wherein an entire or substantially an entire portion of the piezoelectric substance that is arranged inside the frame-shaped region defines the inner opening portion.

5. The vibrating gyro device according to claim 1, wherein a beam that connects an inner region or an outer region and the frame-shaped region is integrally provided with the piezoelectric substance.

6. The vibrating gyro device according to claim 5, wherein the beam is arranged at a position shifted by about 45° from axes of rotation.

7. The vibrating gyro device according to claim 5, wherein an insulator is provided between the beam and wiring.

8. The vibrating gyro device according to claim 1, wherein the frame-shaped region has a circular or substantially circular frame shape or a rectangular or substantially rectangular frame shape.

9. The vibrating gyro device according to claim 1, wherein the piezoelectric substance is a single crystal made of one of lithium niobate, lithium tantalate, or quartz.

10. A vibrating gyro device arranged to detect rotation about two perpendicular or substantially perpendicular axes of rotation that lie in a plane parallel or substantially parallel to a main surface of a piezoelectric substance, the vibrating gyro device comprising:
    the piezoelectric substance including a frame-shaped region, an inner opening portion through which an inner side surface of the frame-shaped region is exposed, and an outer opening portion through which an outer side surface of the frame-shaped region is exposed, the inner opening portion and the outer opening portion being arranged to have axisymmetrical shapes in the main surface of the piezoelectric substance with the two perpendicular or substantially perpendicular axes of rotation defining axes of symmetry;
    a plurality of pairs of main surface electrodes electromechanically coupled with displacement of the frame-shaped region in a direction perpendicular or substantially perpendicular to the main surface of the piezoelectric substance and with displacement of the frame-shaped region in a direction parallel or substantially parallel to the main surface of the piezoelectric substance, axisymmetrically arranged with the two perpendicular or substantially perpendicular axes of rotation defining the axes of symmetry, and bonded to front and back main surfaces of the frame-shaped region; and
    a supporting body arranged to prevent other members of the vibrating gyro device from interfering with the frame-shaped region, to secure a vibration space for the frame-shaped region through which the inner opening portion and the outer opening portion are connected, and to support the piezoelectric substance; wherein
    the piezoelectric substance includes an inner region that is arranged inside of the frame-shaped region;
    the inner region is supported by the supporting body and the inner region supports the frame-shaped region; and
    the frame-shaped region and the inner region are defined by portions of a same piezoelectric layer arranged on a same plane on an upper surface of the supporting body.

11. The vibrating gyro device according to claim 10, wherein an entire or substantially an entire portion of the piezoelectric substance that is arranged outside the frame-shaped region defines the outer opening portion.

12. The vibrating gyro device according to claim 10, wherein
the piezoelectric substance includes an outer region that is arranged outside the frame-shaped region; and
the outer region is supported by the supporting body and the outer region supports the frame-shaped region.

13. The vibrating gyro device according to claim 12, wherein an entire or substantially an entire portion of the piezoelectric substance that is arranged inside the frame-shaped region defines the inner opening portion.

14. The vibrating gyro device according to claim 10, wherein a beam that connects an inner region or an outer region and the frame-shaped region is integrally provided with the piezoelectric substance.

15. The vibrating gyro device according to claim 14, wherein the beam is arranged at a position shifted by about 45° from the axes of rotation.

16. The vibrating gyro device according to claim 14, wherein an insulator is provided between the beam and wiring.

17. The vibrating gyro device according to claim 10, wherein the frame-shaped region has a circular or substantially circular frame shape or a rectangular or substantially rectangular frame shape.

18. The vibrating gyro device according to claim 10, wherein the piezoelectric substance is a single crystal made of one of lithium niobate, lithium tantalate, or quartz.

* * * * *